(12) United States Patent  
Shimakura

(10) Patent No.: US 8,700,591 B2  
(45) Date of Patent: Apr. 15, 2014

(54) SEARCH ENGINE AND SEARCH METHOD

(75) Inventor: Masami Shimakura, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 12/487,537

(22) Filed: Jun. 18, 2009

(65) Prior Publication Data

US 2010/0228754 A1 Sep. 9, 2010

(30) Foreign Application Priority Data

Mar. 9, 2009 (JP) ................................. 2009-055211

(51) Int. Cl.
*G06F 17/30* (2006.01)

(52) U.S. Cl.
USPC ........................................................ 707/706

(58) Field of Classification Search
USPC ............................. 707/712, 999.107, 711, 706
See application file for complete search history.

(56) References Cited

U.S. PATENT DOCUMENTS

| | | | | | |
|---|---|---|---|---|---|
| 3,729,712 | A | * | 4/1973 | Glassman | 360/72.1 |
| 4,232,540 | A | * | 11/1980 | Cain et al. | 72/8.8 |
| 5,809,544 | A | * | 9/1998 | Dorsey et al. | 711/163 |
| 7,049,933 | B1 | * | 5/2006 | Koerner | 340/10.1 |
| 7,123,616 | B2 | | 10/2006 | Weissberger et al. | 370/389 |
| 7,230,839 | B2 | | 6/2007 | Lysinger | 365/49.1 |
| 7,257,087 | B2 | | 8/2007 | Grovenburg | 370/248 |
| 7,403,407 | B1 | * | 7/2008 | Wanzakhade | 365/49.1 |
| 2003/0041126 | A1 | * | 2/2003 | Buford et al. | 709/220 |
| 2003/0053460 | A1 | | 3/2003 | Suda et al. | 370/392 |
| 2004/0233692 | A1 | * | 11/2004 | Ao | 365/49.1 |
| 2005/0156918 | A1 | * | 7/2005 | Chuang et al. | 345/204 |
| 2006/0013217 | A1 | * | 1/2006 | Datla et al. | 370/389 |
| 2006/0059196 | A1 | | 3/2006 | Sato et al. | 707/104.1 |
| 2006/0112424 | A1 | * | 5/2006 | Coley et al. | 726/11 |
| 2006/0128376 | A1 | * | 6/2006 | Alexis | 455/426.1 |
| 2006/0133275 | A1 | * | 6/2006 | Dabagh et al. | 370/230 |
| 2006/0233116 | A1 | | 10/2006 | Kyusojin et al. | 370/252 |
| 2007/0094537 | A1 | * | 4/2007 | Flores et al. | 714/30 |
| 2009/0201709 | A1 | * | 8/2009 | Inoue | 365/49.17 |
| 2009/0323543 | A1 | | 12/2009 | Shimakura | 370/252 |

FOREIGN PATENT DOCUMENTS

| | | |
|---|---|---|
| JP | 61-292571 A | 12/1986 |
| JP | 64-074618 A | 3/1989 |
| JP | 05-012063 A | 1/1993 |
| JP | 2002-116286 A | 4/2002 |
| JP | 2003-22678 A | 1/2003 |
| JP | 2003-92598 A | 3/2003 |
| JP | 3476985 | 12/2003 |
| WO | WO 2004/032435 A1 | 4/2004 |

* cited by examiner

*Primary Examiner* — Etienne Leroux

(74) *Attorney, Agent, or Firm* — Fitzpatrick, Cella, Harper & Scinto

(57) ABSTRACT

A search engine has a plurality of comparators. Discriminants are set in the comparators for each search, and the comparators are selectively connected.

10 Claims, 17 Drawing Sheets

FIG. 6

| | SOURCE IP ADDRESS | DESTINATION IP ADDRESS | PROTOCOL TYPE | DESTINATION PORT NUMBER | INTERFACE NUMBER |
|---|---|---|---|---|---|
| SETTING 1 | ANY | 172.10.1.10 | 6 | 23 | ANY |
| SETTING 2 | 172.10.2.100 TO 172.10.2.200 | 172.10.1.10 | 6 | 21 | 1 |
| SETTING 3 | EXCEPT FOR 172.10.1.20 | 172.10.1.10 | 6 | 9800 TO 9900 | ANY |

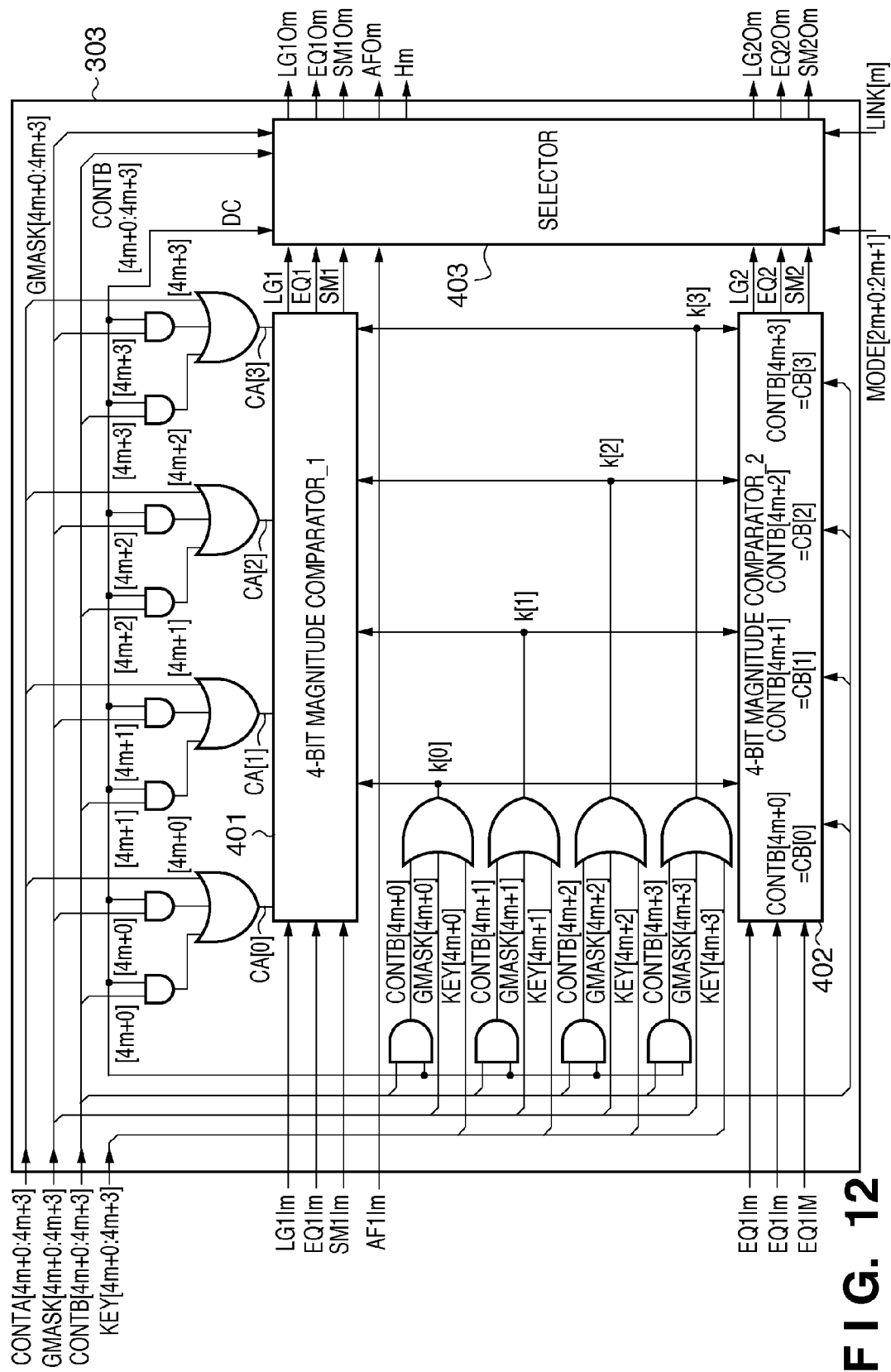
F I G. 12

FIG. 13

| INPUT | | | | | | | | OUTPUT | | |
|---|---|---|---|---|---|---|---|---|---|---|
| COMPARING | | | | CASCADING | | | | | | |
| CA[3], K[3] | CA[2], K[2] | CA[1], K[1] | CA[0], K[0] | SM1IM CA<K | EQ1IM CA=K | LG1IM CA>K | SM1 CA<K | EQ1 CA=K | LG1 CA>K |
| CA[3] > K[3] | X | X | X | X | X | X | 0 | 0 | 1 |
| CA[3] = K[3] | CA[2] > K[2] | X | X | X | X | X | 0 | 0 | 1 |
| CA[3] = K[3] | CA[2] = K[2] | CA[1] > K[1] | X | X | X | X | 0 | 0 | 1 |
| CA[3] = K[3] | CA[2] = K[2] | CA[1] = K[1] | CA[0] > K[0] | X | X | X | 0 | 0 | 1 |
| CA[3] = K[3] | CA[2] = K[2] | CA[1] = K[1] | CA[0] = K[0] | 0 | 0 | 1 | 0 | 0 | 1 |
| CA[3] = K[3] | CA[2] = K[2] | CA[1] = K[1] | CA[0] = K[0] | 0 | 1 | 0 | 0 | 1 | 0 |
| CA[3] = K[3] | CA[2] = K[2] | CA[1] = K[1] | CA[0] = K[0] | 1 | 0 | 0 | 1 | 0 | 0 |
| CA[3] = K[3] | CA[2] = K[2] | CA[1] = K[1] | CA[0] < K[0] | X | X | X | 1 | 0 | 0 |
| CA[3] = K[3] | CA[2] = K[2] | CA[1] < K[1] | X | X | X | X | 1 | 0 | 0 |
| CA[3] = K[3] | CA[2] < K[2] | X | X | X | X | X | 1 | 0 | 0 |
| CA[3] < K[3] | X | X | X | X | X | X | 1 | 0 | 0 |

F I G. 14

| INPUT | | | | CASCADING | | | | OUTPUT | | |
|---|---|---|---|---|---|---|---|---|---|---|
| COMPARING | | | | SM2IM K<CB | EQ2IM K=CB | LG2IM K>CB | | SM2 K<CB | EQ2 K=CB | LG2 K>CB |
| K[3], CB[3] | K[2], CB[2] | K[1], CB[1] | K[0], CB[0] | | | | | | | |
| K[3] > CB[3] | X | X | X | X | X | X | | 0 | 0 | 1 |
| K[3] = CB[3] | K[2] > CB[2] | X | X | X | X | X | | 0 | 0 | 1 |
| K[3] = CB[3] | K[2] = CB[2] | K[1] > CB[1] | X | X | X | X | | 0 | 0 | 1 |
| K[3] = CB[3] | K[2] = CB[2] | K[1] = CB[1] | K[0] > CB[0] | X | X | X | | 0 | 0 | 1 |
| K[3] = CB[3] | K[2] = CB[2] | K[1] = CB[1] | K[0] = CB[0] | 0 | 0 | 1 | | 0 | 0 | 1 |
| K[3] = CB[3] | K[2] = CB[2] | K[1] = CB[1] | K[0] = CB[0] | 0 | 1 | 0 | | 0 | 1 | 0 |
| K[3] = CB[3] | K[2] = CB[2] | K[1] = CB[1] | K[0] = CB[0] | 1 | X | X | | 1 | 0 | 0 |
| K[3] = CB[3] | K[2] = CB[2] | K[1] = CB[1] | K[0] < CB[0] | X | X | X | | 1 | 0 | 0 |
| K[3] = CB[3] | K[2] = CB[2] | K[1] < CB[1] | X | X | X | X | | 1 | 0 | 0 |
| K[3] = CB[3] | K[2] < CB[2] | X | X | X | X | X | | 1 | 0 | 0 |
| K[3] < CB[3] | X | X | X | X | X | X | | 1 | 0 | 0 |

FIG. 15

| | MATCH SEARCH | | | | | |
|---|---|---|---|---|---|---|
| MODE[2m+0:2m+1] | 00 | 00 | 00 | 00 | 00 | 00 |
| LINK[m] | 0 | 0 | 0 | 1 | 1 | 1 |
| LG1 | 1 | 0 | 0 | 1 | 0 | 0 |
| EQ1 | 0 | 1 | 0 | 0 | 1 | 0 |
| SM1 | 0 | 0 | 1 | 0 | 0 | 1 |
| LG2 | X | X | X | X | X | X |
| EQ2 | X | X | X | X | X | X |
| SM2 | X | X | X | X | X | X |
| GMASK[4m+0:4m+3] or CONTB[4m+0:4m+3] | X | X | X | X | X | X |
| AFIm | X | X | X | X | X | X |
| LG1Om | 1 | 0 | 0 | 0 | 0 | 0 |
| EQ1Om | 0 | 1 | 0 | 1 | 1 | 1 |
| SM1Om | 0 | 0 | 1 | 0 | 0 | 0 |
| AFOm | 0 | 0 | 0 | 0 | 0 | 0 |
| LG2Om | X | X | X | X | X | X |
| EQ2Om | X | X | X | X | X | X |
| SM2Om | X | X | X | X | X | X |
| DC | 1 | 1 | 1 | 1 | 1 | 1 |
| Hm | 0 | 1 | 0 | 0 | 1 | 0 |

FIG. 16

| | MISMATCH SEARCH | | | | | | | | | |
|---|---|---|---|---|---|---|---|---|---|---|
| MODE[2m+0:2m+1] | 01 | 01 | 01 | 01 | 01 | 01 | 01 | 01 | 01 | 01 |
| LINK[m] | 0 | 0 | 0 | 0 | 0 | 1 | 1 | 1 | 1 | 1 |
| LG1 | 1 | 0 | 0 | 0 | 0 | 1 | 0 | 0 | 0 | 0 |
| EQ1 | 0 | 1 | 1 | 1 | 0 | 0 | 1 | 1 | 1 | 0 |
| SM1 | 0 | 0 | 0 | 0 | 1 | 0 | 0 | 0 | 0 | 1 |
| LG2 | X | X | X | X | X | X | X | X | X | X |
| EQ2 | X | X | X | X | X | X | X | X | X | X |
| SM2 | X | X | X | X | X | X | X | X | X | X |
| GMASK[4m+0:4m+3] or CONTB[4m+0:4m+3] | X | =0xF | =0xF | ≠0xF | X | X | =0xF | =0xF | ≠0xF | X |
| AFIm | X | 0 | 1 | X | X | X | 0 | 1 | X | X |
| LG1Om | 1 | 0 | 0 | 0 | 0 | 1 | 0 | 0 | 0 | 0 |
| EQ1Om | 0 | 1 | 1 | 1 | 0 | 0 | 1 | 1 | 1 | 0 |
| SM1Om | 0 | 0 | 0 | 0 | 1 | 0 | 0 | 0 | 0 | 1 |
| AFOm | 0 | 0 | 1 | 0 | 0 | 1 | 1 | 1 | 1 | 1 |
| LG2Om | X | X | X | X | X | X | X | X | X | X |
| EQ2Om | X | X | X | X | X | X | X | X | X | X |
| SM2Om | X | X | X | X | X | X | X | X | X | X |
| DC | 1 | 1 | 1 | 1 | 1 | 1 | 1 | 1 | 1 | 1 |
| Hm | 0 | 0 | 0 | 0 | 0 | 1 | 0 | 1 | 0 | 1 |

FIG. 17

| | | | | | | | | | | | RANGE SEARCH (CA ≥ K) and (K ≥ CB) | | | | | | | | | |
|---|---|---|---|---|---|---|---|---|---|---|---|---|---|---|---|---|---|---|---|---|
| MODE[2m+0:2m+1] | 10 | 10 | 10 | 10 | 10 | 10 | 10 | 10 | 10 | 10 | 10 | 10 | 10 | 10 | 10 | 10 | 10 | 10 | 10 | 10 |
| LINK[m] | 0 | 0 | 0 | 0 | 0 | 0 | 0 | 0 | 0 | 0 | 1 | 1 | 1 | 1 | 1 | 1 | 1 | 1 | 1 | 1 |
| LG1 | 1 | 1 | 0 | 0 | 0 | 0 | 0 | 0 | 0 | 0 | 1 | 0 | 0 | 0 | 0 | 0 | 0 | 0 | 0 | 0 |
| EQ1 | 0 | 0 | 1 | 1 | 1 | 1 | 0 | 0 | 0 | 0 | 1 | 1 | 1 | 1 | 1 | 1 | 0 | 0 | 0 | 0 |
| SM1 | 0 | 0 | 0 | 0 | 0 | 0 | 1 | 1 | 1 | 1 | 0 | 0 | 0 | 0 | 0 | 0 | 1 | 1 | 1 | 1 |
| LG2 | 1 | 0 | 1 | 0 | 0 | 0 | 1 | 0 | 0 | 0 | 1 | 0 | 0 | 0 | 0 | 0 | 1 | 0 | 0 | 0 |
| EQ2 | 0 | 1 | 0 | 1 | 1 | 1 | 0 | 1 | 1 | 1 | 0 | 1 | 1 | 1 | 1 | 1 | 0 | 1 | 1 | 1 |
| SM2 | 0 | 0 | 0 | 1 | 0 | 0 | 0 | 1 | 0 | 0 | 0 | 1 | 0 | 0 | 0 | 0 | 0 | 0 | 0 | 0 |
| CONTB[4m+0:4m+3] | X | X | X | X | X | X | X | X | X | X | X | X | X | X | X | X | X | X | X | X |
| GMASK[4m+0:4m+3] | X | X | X | X | X | X | X | X | X | X | ≠0xF | ≠0xF | ≠0xF | ≠0xF | ≠0xF | ≠0xF | ≠0xF | ≠0xF | ≠0xF | =0xF |
| AFIm | X | X | X | X | X | X | X | X | X | X | X | X | X | X | X | X | X | X | X | X |
| LG1Om | 1 | 1 | 0 | 0 | 0 | 0 | 0 | 0 | 0 | 0 | 1 | 0 | 0 | 0 | 0 | 0 | 0 | 0 | 0 | 1 |
| EQ1Om | 0 | 0 | 1 | 1 | 1 | 1 | 0 | 0 | 0 | 0 | 1 | 1 | 1 | 1 | 1 | 1 | 0 | 0 | 0 | 0 |
| SM1Om | 0 | 0 | 0 | 0 | 0 | 0 | 1 | 1 | 1 | 1 | 0 | 0 | 0 | 0 | 0 | 0 | 1 | 1 | 1 | 0 |
| AFOm | X | X | X | X | X | X | X | X | X | X | X | X | X | X | X | X | X | X | X | X |
| LG2Om | 1 | 0 | 1 | 0 | 0 | 0 | 1 | 0 | 0 | 0 | 1 | 0 | 0 | 0 | 0 | 0 | 1 | 0 | 0 | 0 |
| EQ2Om | 0 | 1 | 0 | 1 | 1 | 1 | 0 | 1 | 1 | 1 | 0 | 1 | 1 | 1 | 1 | 1 | 0 | 1 | 1 | 1 |
| SM2Om | 0 | 0 | 0 | 0 | 0 | 0 | 0 | 0 | 0 | 0 | 0 | 0 | 0 | 0 | 0 | 0 | 0 | 0 | 0 | 0 |
| DC | 0 | 0 | 0 | 0 | 0 | 0 | 0 | 0 | 0 | 0 | 0 | 0 | 0 | 0 | 0 | 0 | 0 | 0 | 0 | 0 |
| Hm | 0 | 0 | 0 | 0 | 0 | 0 | 0 | 0 | 0 | 1 | 0 | 1 | 0 | 0 | 0 | 0 | 0 | 0 | 0 | 1 |

F I G. 18

| | OUT-OF-RANGE SEARCH (CA < K) and (K < CB) | | | | | | | | | | | | | | | | |
|---|---|---|---|---|---|---|---|---|---|---|---|---|---|---|---|---|---|
| MODE[2m+0:2m+1] | 11 | 11 | 11 | 11 | 11 | 11 | 11 | 11 | 11 | 11 | 11 | 11 | 11 | 11 | 11 | 11 | 11 |
| LINK[m] | 0 | 0 | 0 | 0 | 0 | 0 | 0 | 0 | 0 | 0 | 1 | 1 | 1 | 1 | 1 | 1 | 1 |
| LG1 | 1 | 1 | 0 | 1 | 0 | 0 | 0 | 1 | 1 | 0 | 1 | 0 | 0 | 0 | 0 | 0 | X |
| EQ1 | 0 | 0 | 1 | 0 | 1 | 1 | 0 | 0 | 0 | 1 | 0 | 1 | 1 | 1 | 1 | 0 | X |
| SM1 | 0 | 0 | 0 | 0 | 0 | 0 | 1 | 0 | 0 | 0 | 0 | 0 | 0 | 0 | 0 | 1 | X |
| LG2 | 1 | 0 | 1 | 0 | 1 | 0 | 0 | 0 | 1 | 1 | 1 | 1 | 0 | 1 | 0 | 0 | X |
| EQ2 | 0 | 1 | 0 | 1 | 0 | 1 | 0 | 1 | 0 | 0 | 0 | 0 | 1 | 0 | 1 | 0 | X |
| SM2 | 0 | 0 | 0 | 0 | 0 | 0 | 1 | 0 | 0 | 0 | 0 | 0 | 0 | 0 | 0 | 1 | X |
| CONTB[4m+0:4m+3] | X | X | X | X | X | X | X | X | X | X | X | X | X | X | X | X | X |
| GMASK[4m+0:4m+3] | X | X | X | X | X | X | X | X | X | X | ≠0xF | ≠0xF | ≠0xF | ≠0xF | ≠0xF | ≠0xF | =0xF |
| AFIm | X | X | X | X | X | X | X | X | X | X | X | X | X | X | X | X | X |
| LG1Om | 1 | 1 | 0 | 1 | 0 | 0 | 0 | 1 | 1 | 0 | 1 | 0 | 0 | 0 | 0 | 0 | 0 |
| EQ1Om | 0 | 0 | 1 | 0 | 1 | 1 | 0 | 0 | 0 | 1 | 0 | 1 | 1 | 1 | 1 | 0 | 1 |
| SM1Om | 0 | 0 | 0 | 0 | 0 | 0 | 1 | 0 | 0 | 0 | 0 | 0 | 0 | 0 | 0 | 1 | 0 |
| AFOm | X | X | X | X | X | X | X | X | X | X | X | X | X | X | X | X | X |
| LG2Om | 1 | 0 | 1 | 0 | 1 | 0 | 0 | 0 | 1 | 1 | 1 | 1 | 0 | 1 | 0 | 0 | 0 |
| EQ2Om | 0 | 1 | 0 | 1 | 0 | 1 | 0 | 1 | 0 | 0 | 0 | 0 | 1 | 0 | 1 | 0 | 1 |
| SM2Om | 0 | 0 | 0 | 0 | 0 | 0 | 1 | 0 | 0 | 0 | 0 | 0 | 0 | 0 | 0 | 1 | 0 |
| DC | 0 | 0 | 0 | 0 | 0 | 0 | 0 | 0 | 0 | 0 | 0 | 0 | 0 | 0 | 0 | 0 | 0 |
| Hm | 0 | 0 | 0 | 0 | 0 | 0 | 0 | 0 | 0 | 0 | 0 | 0 | 0 | 0 | 0 | 0 | 1 |

SEARCH ENGINE AND SEARCH METHOD

BACKGROUND OF THE INVENTION

1. Field of the Invention

The present invention relates to a search engine or a search method.

2. Description of the Related Art

Conventionally, to attain a high-speed search, the use of a CAM (Content Addressable Memory) is known. For example, in a router or the like, the CAM is used for increasing the speed of an IP address search in a TCP/IP process. In search processing including range designation, it is impossible to use the conventional CAM and software is used to execute sequential comparison/search processing. For example, an SPD (Security Policy Database) used in IPsec (IP Security Protocol) is searched by a plurality of elements and search conditions different for respective elements, and the search conditions include range designation. The SPD serves as a database for managing security policies, and IPsec processes packets in accordance with the security policies.

Such search processing is also done in a filtering process for combating, for example, DoS (Denial of Service) attack. The search processing is executed in not only network protocol processing but also image processing.

In a device having a high-speed CPU such as a PC (Personal Computer), performing such search processing does not degrade performance significantly. If, however, a product incorporates a CPU, such as that included in an inexpensive consumer device, which has a performance lower than the CPU of a PC, and the CPU is responsible for implementing the main functions of the product, it is difficult for the CPU to execute search processing which generally imposes a heavy load. There has also been proposed a technique which extends the conventional CAM using a magnitude comparator to be able to perform a comparison of magnitudes, as disclosed in U.S. Pat. No. 7,230,839.

According to the proposal disclosed in U.S. Pat. No. 7,230,839, it is impossible to recombine search elements unlike the above-described search processing. Furthermore, in this proposal, it is impossible to recombine search conditions (match, mismatch, range, out-of-range) or to simultaneously search for a plurality of combinations of elements.

The magnitude comparator disclosed in U.S. Pat. No. 7,230,839 is formed by special cells, and is unsuitable for developing an LSI to be mounted on an inexpensive consumer device in terms of selection of a semiconductor development vendor, a development period, and cost. There is a demand for a search engine which can be formed by standard logic cells that have been widely used.

The present invention makes it possible to execute various search processes with a single search engine. Other features of the present invention will become apparent from the following description of exemplary embodiments.

SUMMARY OF THE INVENTION

A search engine according to the present invention comprises: a plurality of comparison units each including two magnitude comparators; a connection unit which selectively connects the plurality of comparison units; and a setting unit which sets discriminants in the plurality of comparison units for each search, and sets the connection unit to selectively connect the plurality of comparison units.

According to the present invention, it is possible to execute various search processes with a single search engine.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a setting table for an application according to the embodiment of the present invention;

FIG. 12 is a diagram for explaining a comparator core portion according to the embodiment of the present invention in detail;

FIG. 13 is a truth table of a 4-bit magnitude comparator_1 according to the embodiment of the present invention;

FIG. 14 is a truth table of a 4-bit magnitude comparator_2 according to the embodiment of the present invention;

FIG. 15 is a truth table of a selector in a match search mode according to the embodiment of the present invention;

FIG. 16 is a truth table of the selector in a mismatch search mode according to the embodiment of the present invention;

FIG. 17 is a truth table of the selector in a range search mode according to the embodiment of the present invention; and FIG. 18 is a truth table of the selector in an out-of-range search mode according to the embodiment of the present invention.

DESCRIPTION OF THE EMBODIMENTS

Figure 1:
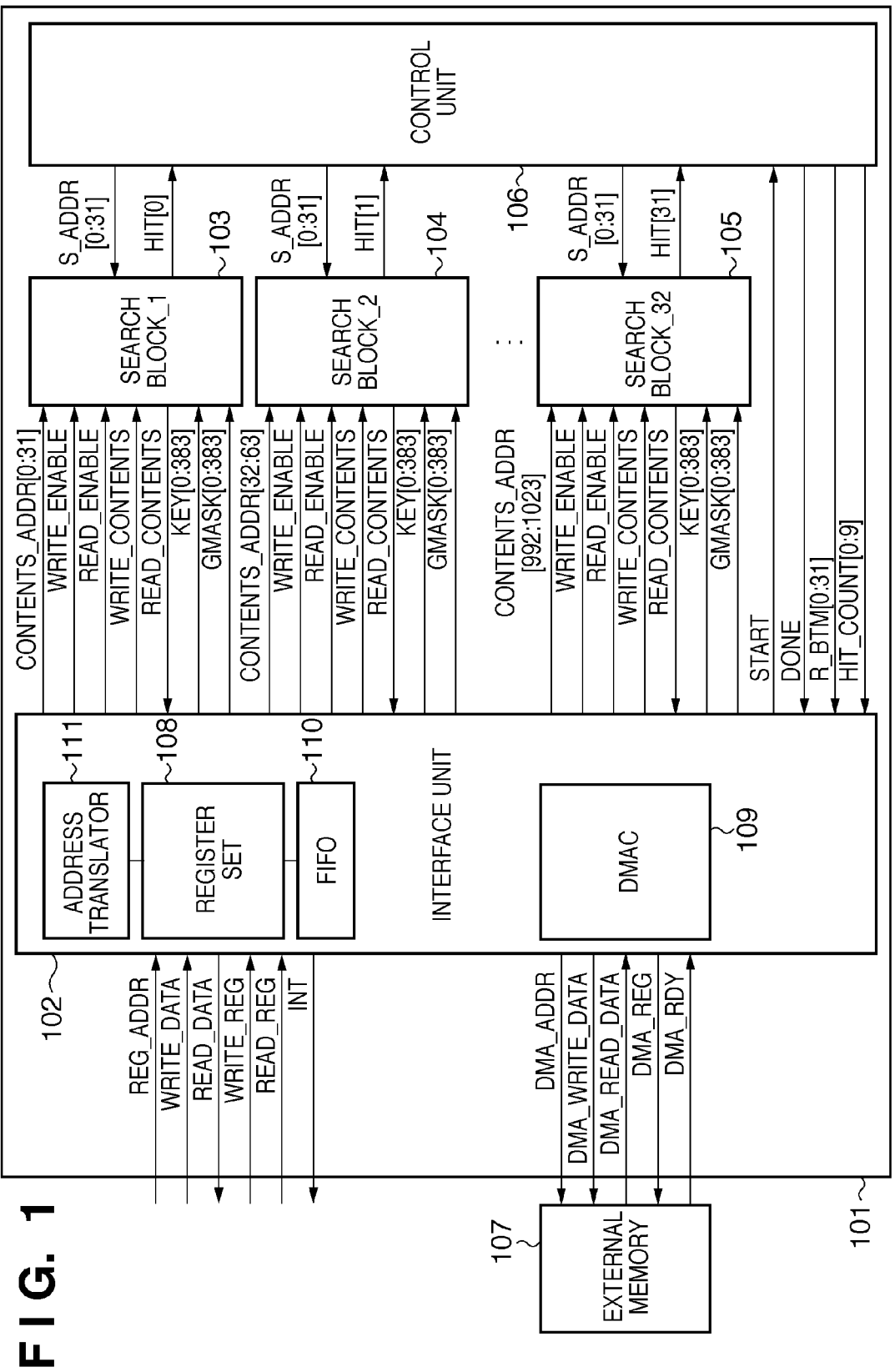
FIG. 1 is a block diagram showing an arrangement according to an embodiment of the present invention.
Figure 2:
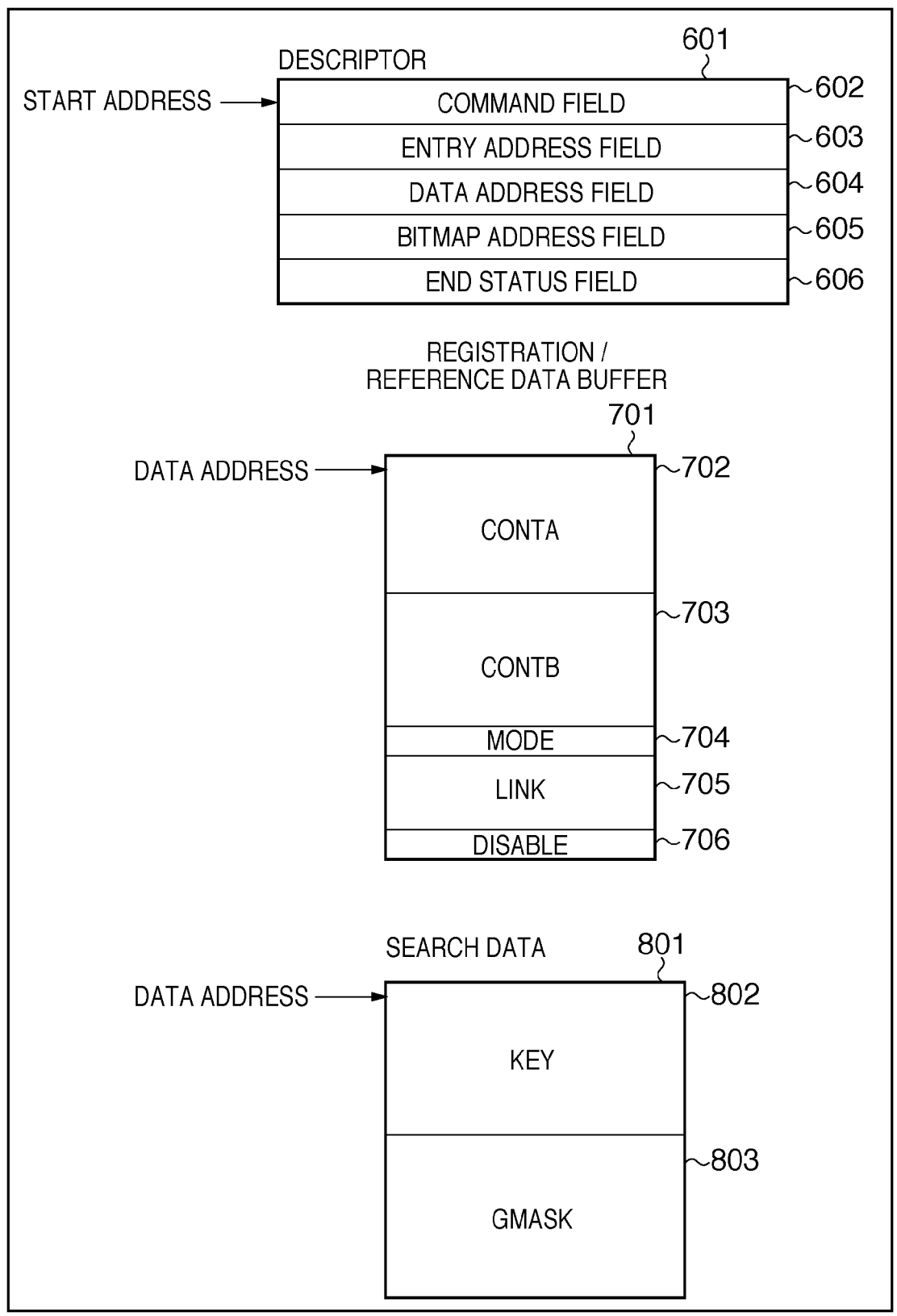
FIG. 2 is a view showing the data structure of a descriptor, the structure of a registration/reference data buffer, and search data according to the embodiment of the present invention.

FIG. 1 is a schematic block diagram showing a search engine (to be referred to as an SE hereinafter) 101 to which the present invention is applied. The SE 101 is used for various data processes. The SE 101 reads out a descriptor 601 and various accompanying data (a registration/reference data buffer 701 and search data 801) shown in FIG. 2 from an external memory 107, and then executes command processes such as search, registration, reference, and delete processes as main functions. This read processing is performed by a DMAC (Direct Memory Access Controller) 109 built in an interface unit 102.

Figure 3:
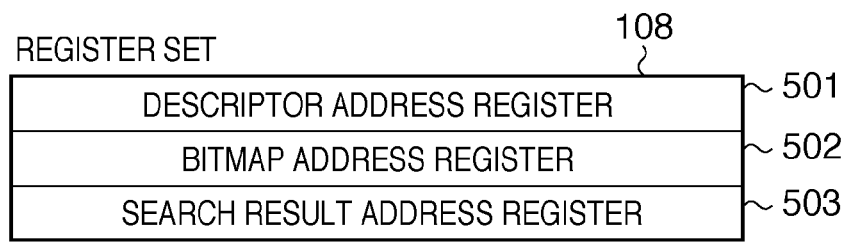
FIG. 3 is a block diagram showing the arrangement of a register set built in an interface unit according to the embodiment of the present invention.

The interface unit 102 includes a register set 108. FIG. 3 shows details of the register set 108. The register set 108 includes a descriptor address register 501, bitmap address register 502, and search result address register 503. A command is transmitted to the SE 101 by writing, in the descriptor address register 501, the start address of the descriptor 601 stored in the external memory 107. The written start address of the descriptor 601 is temporarily stored in a FIFO (first-in first-out memory) 110 built in the interface unit 102. The SE 101 retrieves the start address of the descriptor 601 from the FIFO 110, uses the retrieved start address to read out the descriptor 601 and the accompanying various data (the registration/reference data buffer 701 and search data 801) from the external memory 107 by the DMAC 109, and then executes a command.

A register within the register set 108 is selected by a REG_ADDR signal. Data to be written in the selected register is transmitted by a WRITE_DATA signal, and is written in the register by a WRITE_REG signal. Data to be read out from the register is selected by the REG_ADDR signal and a READ_REG signal, and is transmitted outside the SE 101 by a READ_DATA signal.

The DMAC 109 controls a DMA operation using a DMA_REQ signal and a DMA_RDY signal in addition to a DMA_ADDR signal which selects the address of the external memory 107. During the DMA operation, data to be written/read is transmitted by a DMA_WRITE_DATA signal and a DMA_READ_DATA signal.

Figure 4:
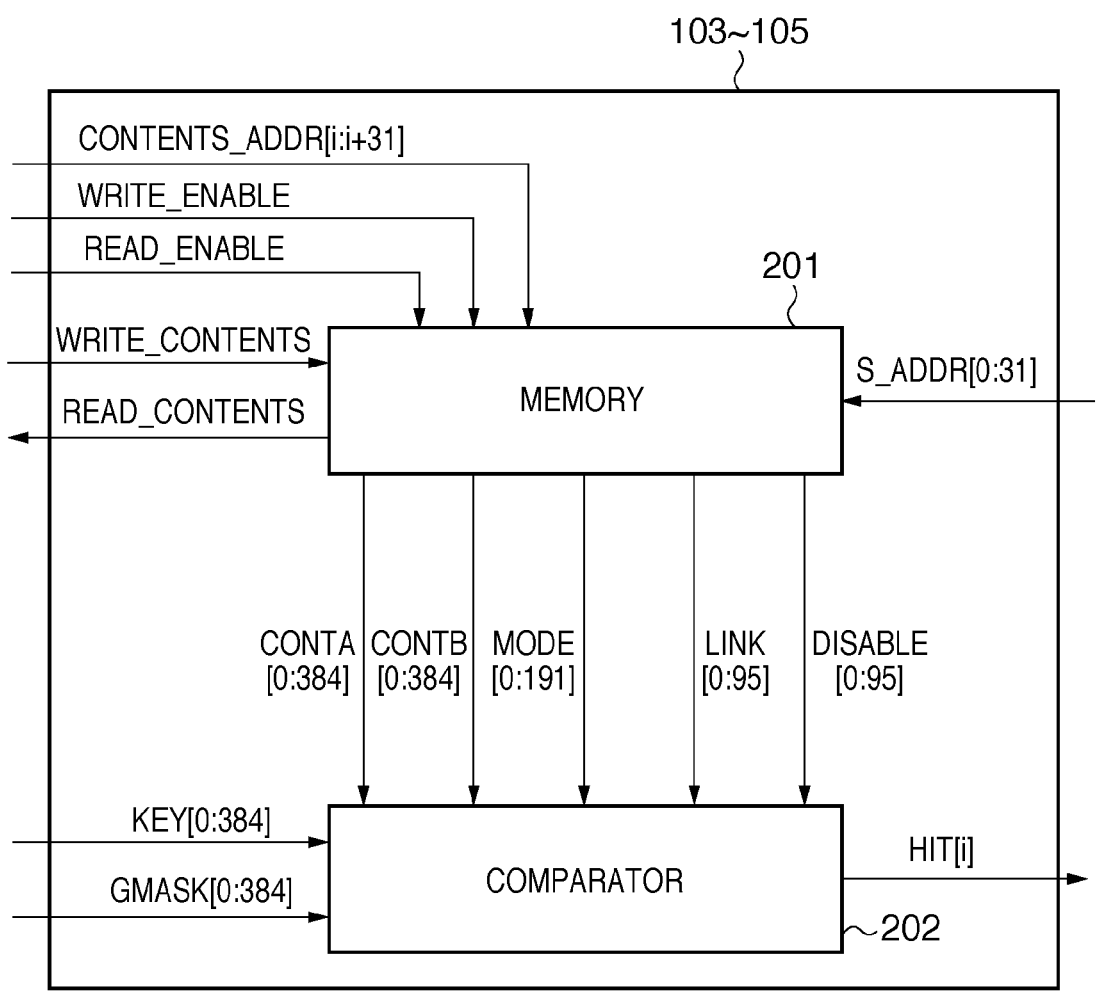
FIG. 4 is a block diagram for explaining a search block according to the embodiment of the present invention in detail.
Figure 5:
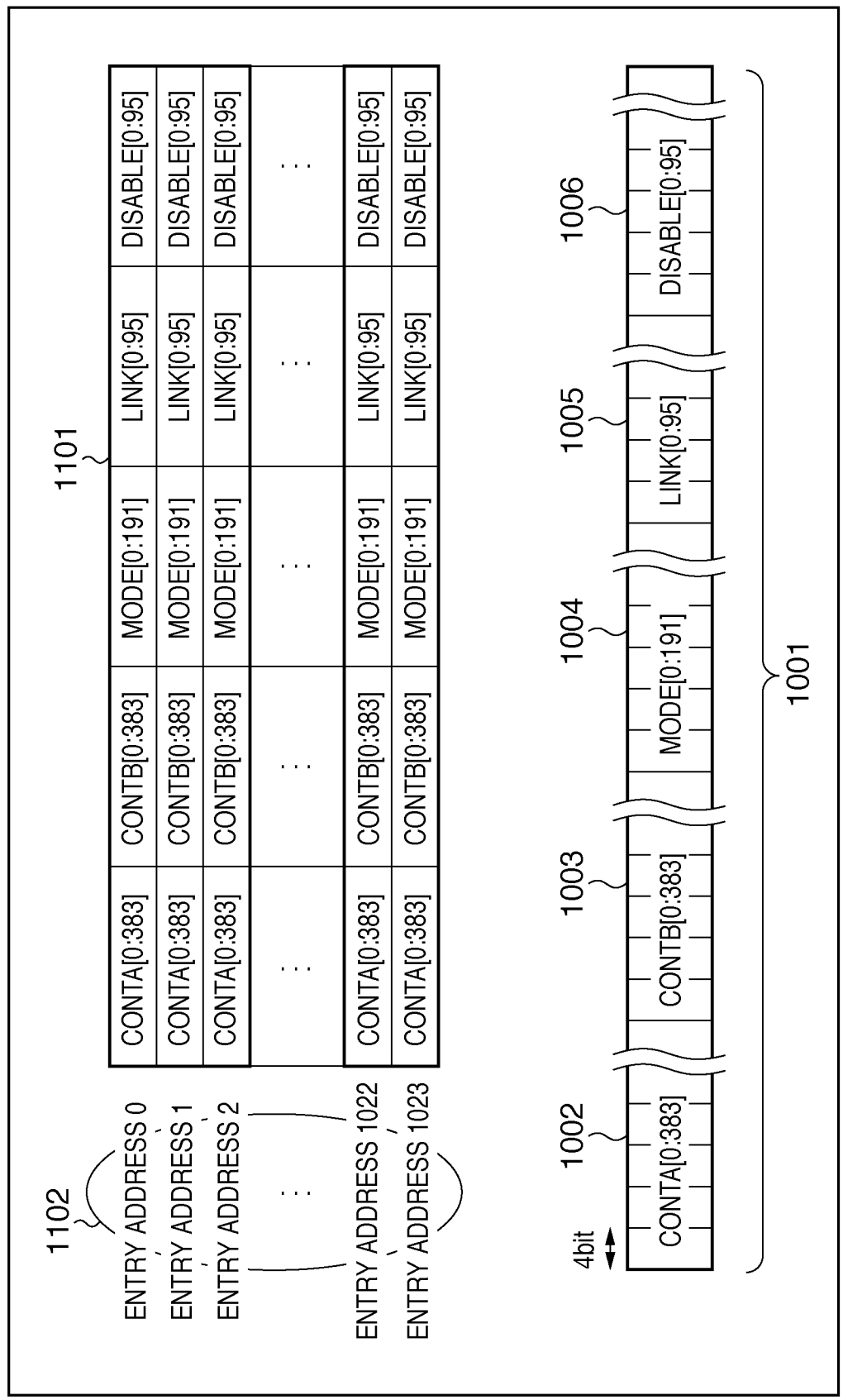
FIG. 5 is a view showing the structure of a search table and the breakdown of a 1152-bit word according to the embodiment of the present invention.

In this embodiment, the SE 101 includes 32 search blocks, that is, search block_1 to search block_32 denoted by reference numerals 103 to 105, having a search function. The internal arrangements of search block_1 to search block_32 denoted by reference numerals 103 to 105 are identical and FIG. 4 shows their outline. A memory 201 built in each search block includes a plurality of memories, and the total bit width of the memory 201 is 1152 bits. By totalizing all the memories in search blocks, they can be considered as a memory having a capacity of 1152-bit word×1024 addresses. The upper side of FIG. 5 shows the concept of this memory. In this specification, each address will be referred to as an entry address 1102; and the memory, a search table 1101, hereinafter. The lower side of FIG. 5 shows the breakdown of a 1152-bit word. In this embodiment, a 1152-bit word at an arbitrary entry address is formed by 96 regions each having 4 bits. Note that data 1001 as a 1152-bit word will be referred to as entry registration data hereinafter. Although 32 search blocks are prepared in this embodiment, the present invention is not limited to the mode in which a search unit is divided into a plurality of search blocks.

As a search mode, a match search (search mode=00), a mismatch search (search mode=01), a range search (search mode=10), and an out-of-range search (search mode=11) are available in this embodiment. In the match search (search mode=00) and mismatch search (search mode=01), a match/mismatch is determined by a bit-by-bit comparison. In the range search and out-of-range search, it is determined for each region (4 bits) or each connected region formed by connecting a plurality of neighboring regions whether a corresponding region falls between a preset upper limit and lower limit. That is, a search mode is set in accordance with MODE[0:191] data 1004 for each region or each connected region.

Connection of neighboring regions is set based on LINK [0:95] data 1005. The LINK[0:95] data 1005 designates the connection states of 96 regions. In the data 1005, a value 1 indicates separation from a succeeding region; and a value 0, connection with a succeeding region. Furthermore, unused regions are set based on DISABLE[0:95] data 1006.

The roles of a CONTA 1002 and CONTB 1003 vary depending on the search mode. In the case of a match search, similarly to the operation of a standard ternary CAM, the CONTA 1002 stores data to be compared, and the CONTB 1003 stores "Don't Care" bits used in the ternary CAM. In the case of a mismatch search, the CONTA 1002 stores data to be compared, and the CONTB 1003 stores "Don't Care" bits. In the case of a range search or out-of-range search, the CONTA 1002 stores an upper limit of a range and the CONTB 1003 stores a lower limit of the range.

The operations of commands such as search, registration, reference, and delete commands will be explained. For descriptive convenience of command processing, packet filtering which has been widely used in network communication processing is exemplified. The packet filtering is a function of selecting, from packets received from a network line, given packets based on information contained in the received packets or reception environment. The information contained in the packets or reception environment includes various kinds of information. In this embodiment, a source IP address, a destination IP address, a protocol type, and the destination port number of an upper protocol are used as the information contained in a received packet, and an interface number for reception is used as information contained in the reception environment. This filtering discards packets which match conditions registered with the search table 1101, and passes through other packets.

The reception environment in this embodiment has two reception interfaces with interface numbers 1 and 2. Assume that a setting application of the packet filtering performs settings shown in FIG. 6. Assume also that the IP address of a server in which the packet filtering works is "172.10.1.10".

In setting 1 in FIG. 6, requests using Telnet (a port number "23") are precluded for all connected clients. In setting 2, requests using FTP (a port number "21") via interface number 1 are precluded for clients having IP addresses "172.10.2.100" to "172.10.2.200". In setting 3, services of port numbers "9800" to "9900" are precluded for clients except for a client having an IP address "172.10.1.20". Referring to FIG. 6, "ANY" represents an arbitrary value. Each of the source IP address field in setting 2 and the destination port number in setting 3 designates a range. The source IP address field in setting 3 is used to check a mismatch.

Figure 7:
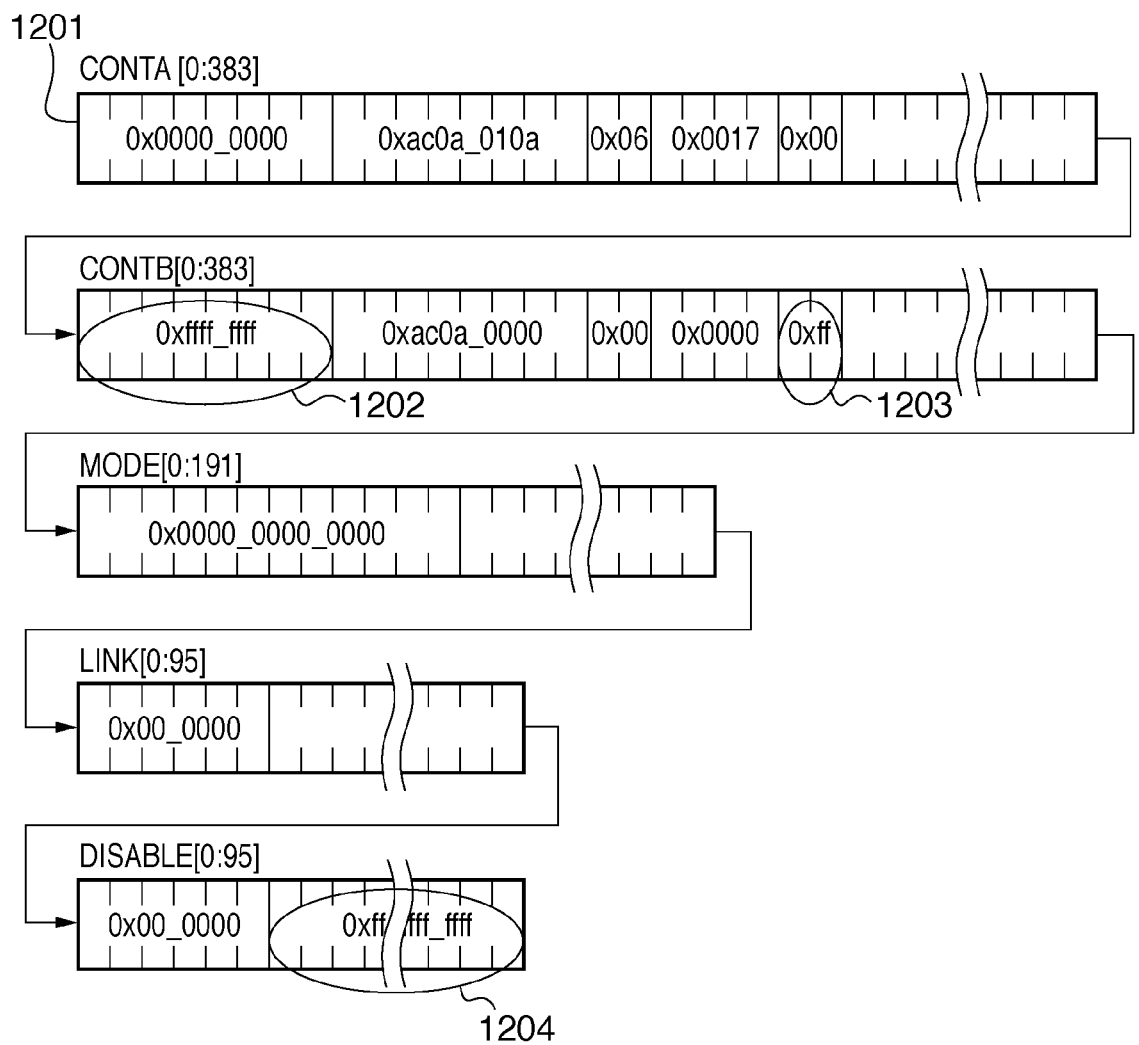
FIG. 7 is a view showing one structure of registration data according to the embodiment of the present invention.

The operation of the registration command will be described. Contents in FIG. 6 are set in the search table 1101 using the registration command. First, as shown in FIG. 7, registration data 1201 corresponding to setting 1 is prepared in the external memory 107. In the source IP address field and interface number field, "ANY" is set. In corresponding portions 1202 and 1203 of a CONTB, "Don't Care" bits are set. Since effective bits of a CONTA are 24×4 bits, 1 is set in a corresponding portion 1204 of a DISABLE corresponding to unused bits (72×4).

Next, the descriptor 601 is prepared in the external memory 107. The contents of the descriptor 601 are as follows.

A registration command code (0x0000_0001) is set in a command field 602. An unused entry address of the search table 1101 is set in an entry address field 603. In this example, since the search table 1101 has just been initialized and is entirely unused, an entry address 0 (0x0000_0000) is set. The start address of the prepared registration data 1201 is set in a data address field 604. Zero is set in a bitmap address field 605 since the registration command does not use this field. Zero is set in an end status field 606. By setting zero in the end status field 606, it is possible to recognize the end of the command by a polling system when the SE 101 writes a value other than zero in the end status field 606 upon completion of the command.

The SE 101 is notified of the registration command by writing the start address of the prepared descriptor 601 in the descriptor address register 501.

The internal operation of the SE 101 which has been notified will be explained. The interface unit 102 reads out the start address of the descriptor 601 which has been written in the FIFO 110. After that, the interface unit 102 activates the incorporated DMAC 109 to load the descriptor 601 stored in the external memory 107 into a buffer within the interface unit 102. After analyzing the command and recognizing that the command is a registration command, the interface unit 102 reactivates the DMAC 109 to load the registration data from the external memory 107. The value written in the entry address field 603 is output as CONTENTS_ADDR[0:1023] signals to the memories 201 of the search blocks 103 to 105. The memory 201 of a corresponding search block (its entry address is "0") is selected, and the registration data loaded by the DMAC 109 is transmitted by a WRITE_CONTENTS signal, and is written in the memory 201 by a WRITE_ENABLE signal.

Figure 8:
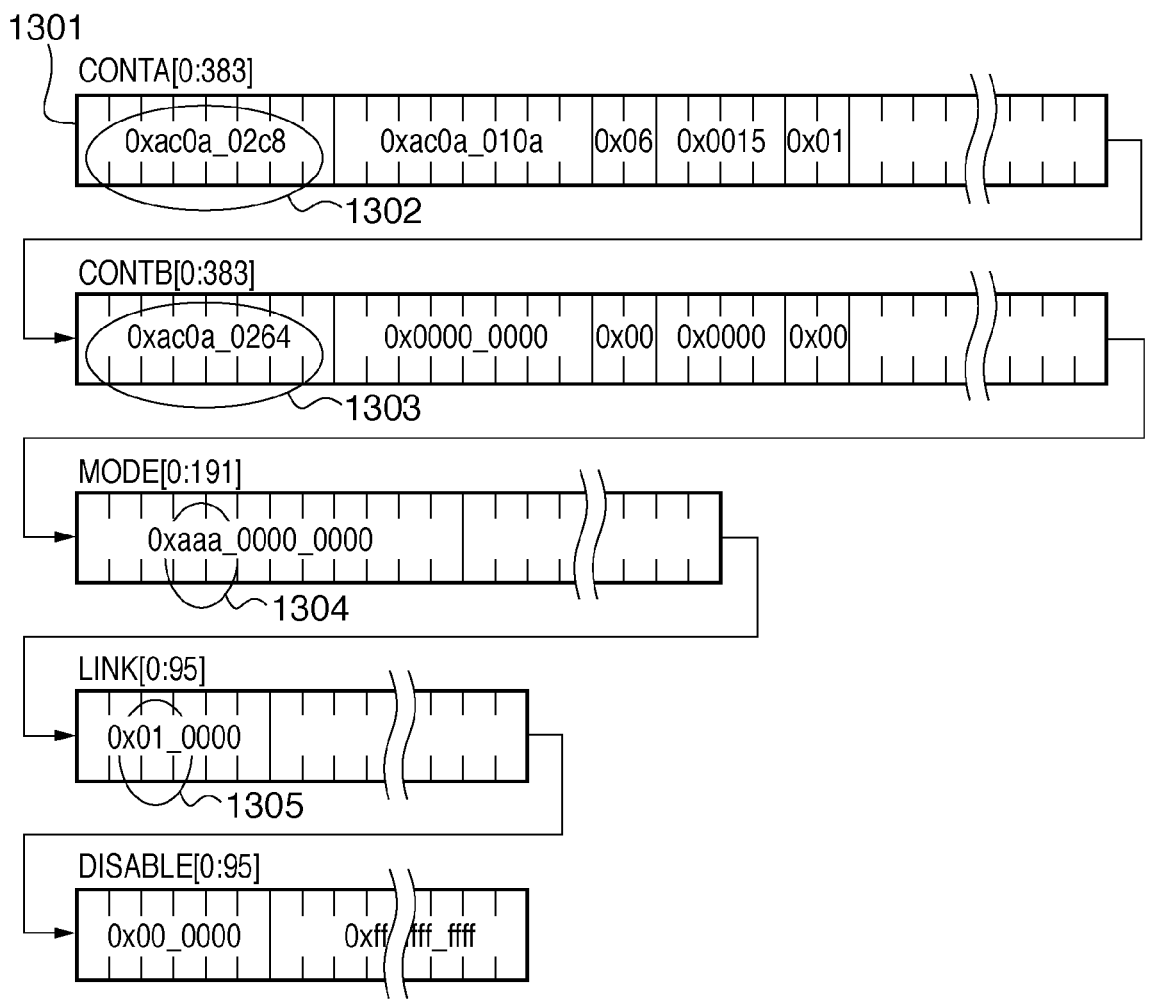
FIG. 8 is a view showing another structure of the registration data according to the embodiment of the present invention.

As shown in FIG. 8, registration data 1301 corresponding to setting 2 of FIG. 6 is prepared in the external memory 107. The source IP address field designates an IP address range from "172.10.2.100" to "172.10.2.200". A value "172.10.2.200" (0xac0a02c8) is, therefore, set in a corresponding portion 1302 of a CONTA. A value "172.10.2.100" (0xac0a0264) is set in a corresponding portion 1303 of a CONTB. To designate a range search, a code "10" indicating a range search is set in a corresponding portion 1304 of a MODE. To connect the eight regions to be independent of other regions, a value "1" representing a connection delimiter is set in a corresponding portion 1305 of a LINK. The same operation as the above-described one for setting 1 is performed except that the entry address written in the search table 1101 is "1".

Figure 9:
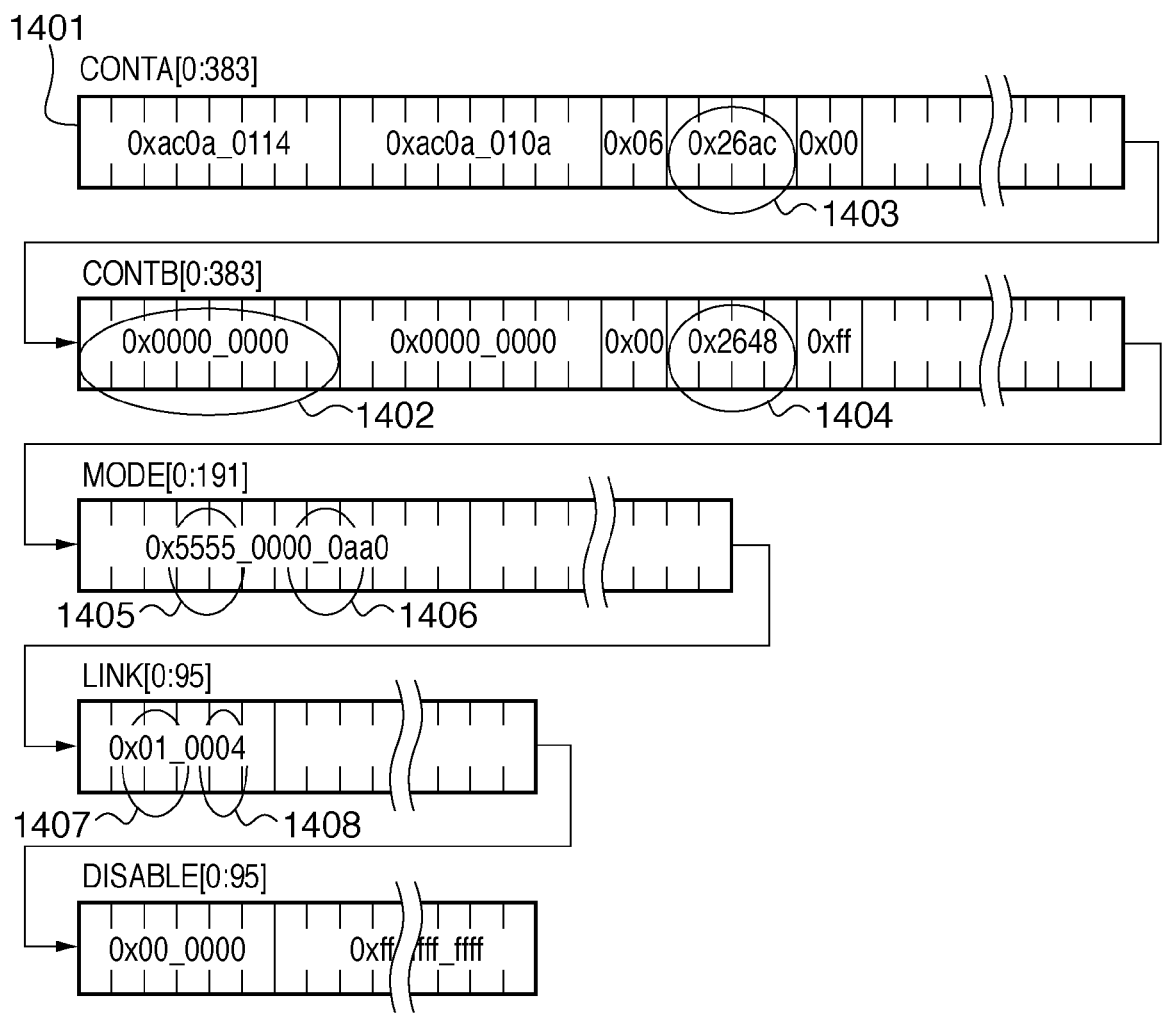
FIG. 9 is a view showing still another structure of the registration data according to the embodiment of the present invention.

As shown in FIG. 9, registration data 1401 corresponding to setting 3 of FIG. 6 is prepared in the external memory 107. Since the destination port number field designates a range, portions 1403, 1404, 1406, and 1408 are set as explained above. Furthermore, since the source IP address filed designates a mismatch search, a code "01" indicating a mismatch search is set in a corresponding portion 1405 of a MODE. A value "1" representing a connection delimiter is set in a corresponding portion 1407 of a LINK. The same operation as the above-described one for setting 1 is performed except that the entry address written in the search table 1101 is "3".

The operation of the delete command will be described. The delete command deletes registration data written at a designated entry address from the search table 1101. More specifically, the delete command sets "1" in DISABLE[0:95] bits at the designated entry address. With this operation, the entry address is excluded from search targets in search command processing (to be described later). A delete command code is "0x0000_0002".

The operation of the reference command will be explained. The reference command transfers registration data written at a designated entry address in the search table 1101 to the registration/reference data buffer 701 whose start address is written in the data address field of the descriptor 601. The reference command is prepared for referring to registration data, and for using, in the same manner as a normal memory, regions other than those to be searched, that is, regions whose DISABLE bits have a value "1". That is, the reference command is used for storing an address for a data structure associated with registration data or directly storing associated information. A reference command code is "0x0000_0003".

Figure 10:
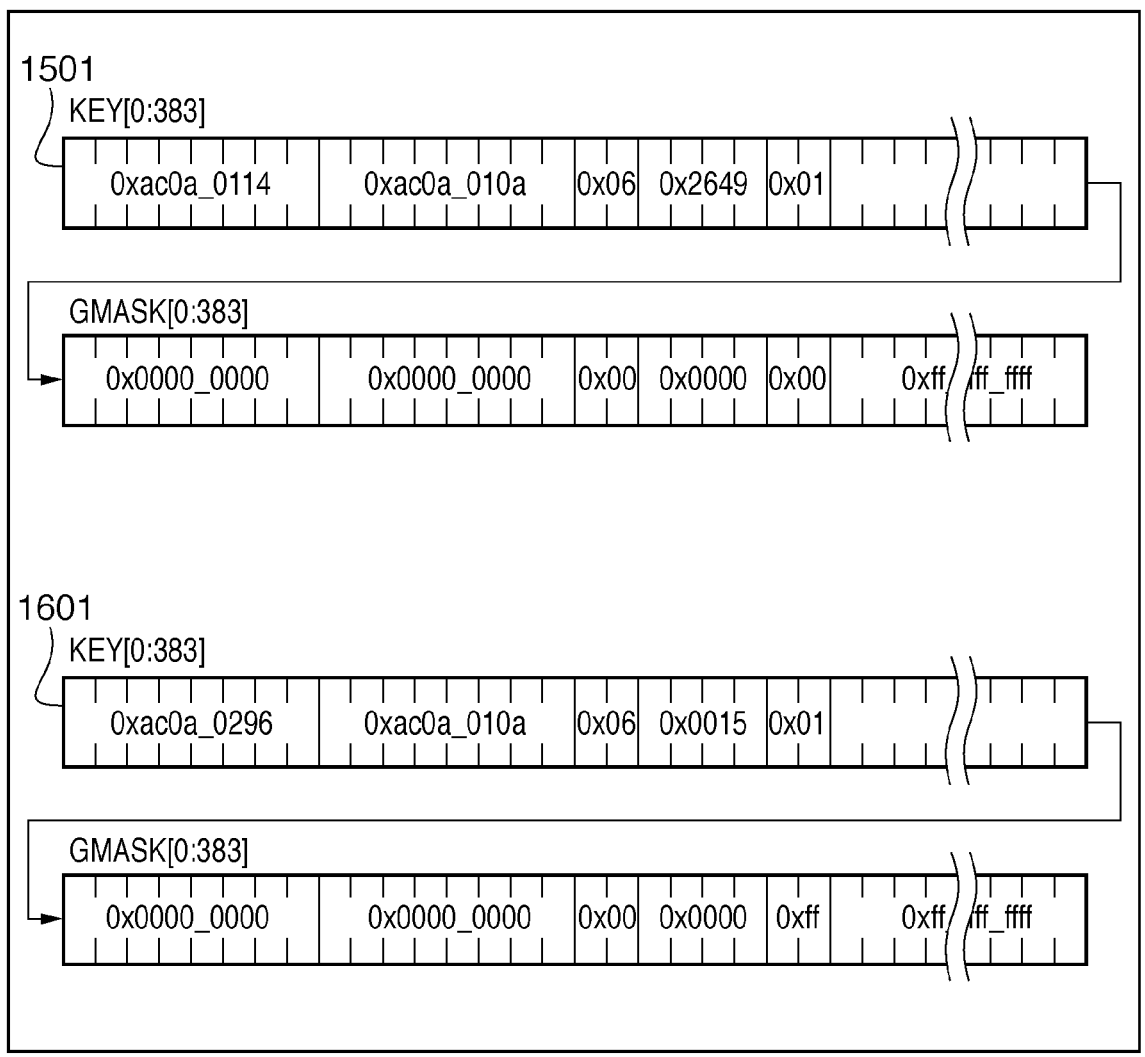
FIG. 10 is a view showing the structure of a search key and mask information according to the embodiment of the present invention.

The operation of the search command will be described. The search command is processing of determining whether the contents of the search data 801 as data formed by combining a KEY and a GMASK shown in FIG. 2 match conditions written at each entry address registered with the search table 1101. Note that the KEY indicates a search key and the GMASK indicates a global mask. FIG. 10 shows a practical example.

Upon determining that a received descriptor is a search command, the interface unit 102 activates the DMAC 109 to read out the search data 801 stored in the external memory 107. The DMAC 109 transmits the search data 801 to a comparator 202 of each of the search blocks 103 to 105 through a KEY[0:383] signal and a GMASK[0:383] signal. Then, the interface unit 102 instructs, by using a START signal, a control unit 106 to start a search. Upon start of the search, the control unit 106 outputs an address to the memory 201 of each of the search blocks 103 to 105 using an S_ADDR signal. The address is output as 32 entry addresses, that is, address 0 to address 31, of the memory 201 of each of the search blocks 103 to 105, while being incremented by one for each operation clock. With this memory access, all data registered with the search table 1101 are sequentially read out for each operation clock, and are transmitted to the comparator 202 of each of the search blocks 103 to 105.

Figure 11:
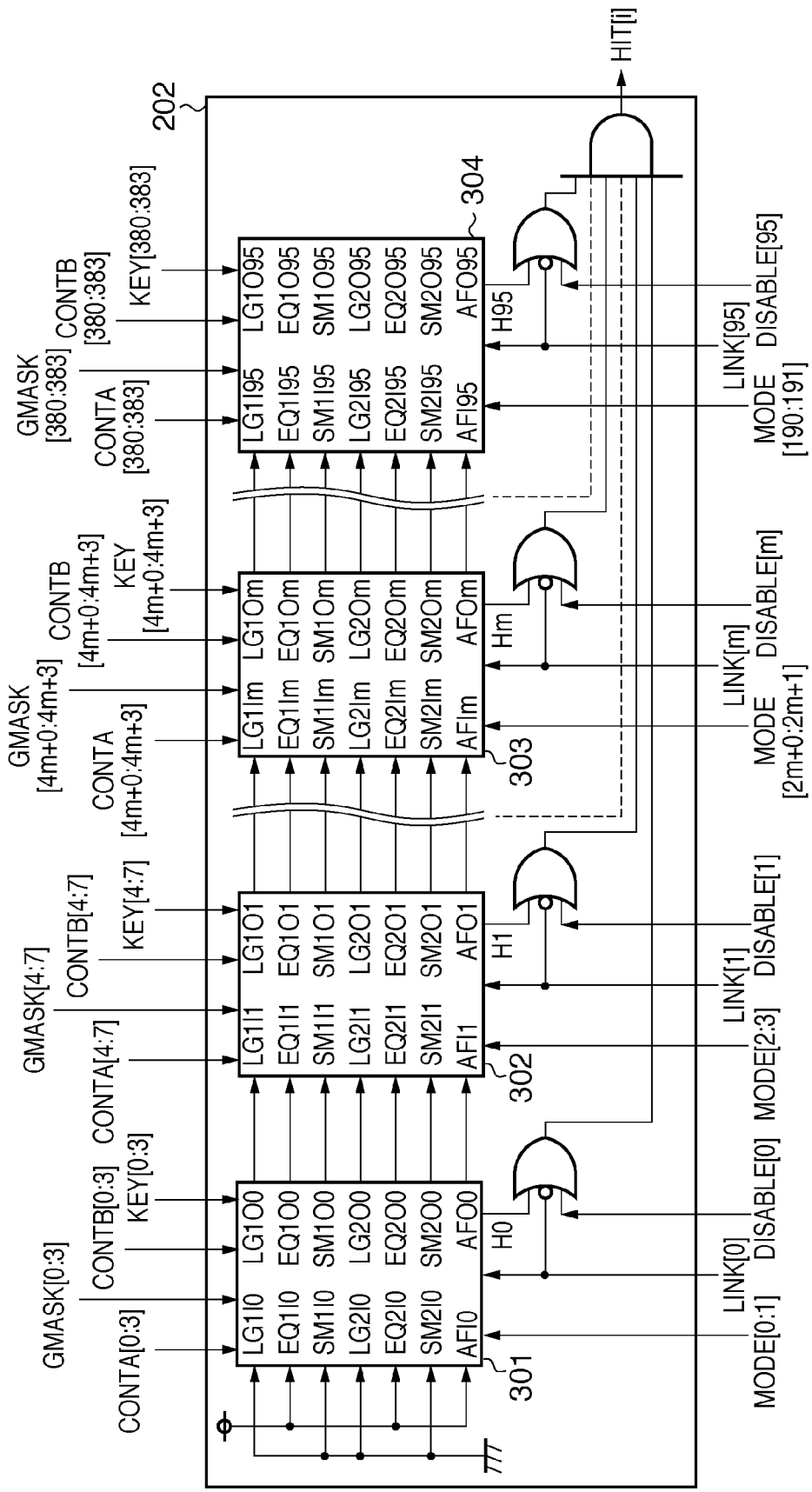
FIG. 11 is a diagram for explaining a comparator according to the embodiment of the present invention in detail.

FIG. 11 shows details of the comparator 202. The comparator 202 includes 96 comparator core portions denoted by reference numerals 301 to 304. In each comparator core portion, CONTA, CONTB, KEY, and GMASK signals each having 4 bits, a MODE signal having 2 bits, and a LINK signal having 1 bit are input. In addition, LG1On, EQ1On, SM1On, LG2On, EQ2On, SM2On, and AFOn signals as carry signals from a comparator core portion of the preceding stage are input to each comparator core portion. Note that n is an integer between 0 and 94. As for the carry input of the comparator core portion 301 of the first stage, an initial value is "0" for LG1I0, SM1I0, LG2I0, and SM2I0 signals, and it is "1" for EQ1I0, EQ2I0, and AFI0 signals. In the signal notation in FIG. 11, "I" for the LG1I0 signal indicates input, and "O" for the LG1O0 signal indicates output. Furthermore, "0" for the LG1I0 and LG1O0 signals represents the 0th comparator core portion among the 96 comparator core portions.

FIG. 12 shows the internal arrangement of the mth comparator core portion 303 as an example. Note that m is an integer between 0 and 95 and the same goes for the following description. The comparator core portion 303 serving as a comparison unit includes a 4-bit magnitude comparator_1 401, a 4-bit magnitude comparator_2 402, a selector 403, and several logic gates. The comparator core portion 303 has the two 4-bit magnitude comparators 401 and 402. FIG. 13 shows a truth table associated with input/output signals of the 4-bit magnitude comparator_1 401. FIG. 14 shows a truth table associated with input/output signals of the 4-bit magnitude comparator_2 402. These 4-bit magnitude comparators have the same function as a generally known 4-bit magnitude comparator.

In addition to CONTB, MODE, GMASK, LINK, and AF signals, LG1, EQ1, and SM1 signals as carry signals output from the 4-bit magnitude comparator_1 401 and LG2, EQ2, and SM2 signals as carry signals output from the 4-bit magnitude comparator_2 402 are input to the selector 403. The operation of the selector 403 changes depending on the MODE[2m+0:2m+1] signal (search mode). The search mode includes four modes, that is, a match search (search mode=00), a mismatch search (search mode=01), a range search (search mode=10), and an out-of-range search (search mode=11), as described above. The operation of the selector 403 for each search mode will be explained below.

In the match search (search mode=00), the LG2, EQ2, and SM2 signals output from the 4-bit magnitude comparator_2 402 are not used. In the match search, data transmitted by the CONTB signal has the following structure so as to have the same meaning as a "Don't Care" bit used in a ternary CAM. That is, the data has a structure so that the selector 403 outputs a DC signal having a value "1" and the CONTB signals serve as mask signals for input signals CA[0] to CA[3] and input signals K[0] to K[3] of the 4-bit magnitude comparator_1 401. The DC signal is also used in the same way in the mismatch search (search mode=01). That is, the selector 403 disables the output of one of the two magnitude comparators in accordance with the search mode.

FIG. 15 shows a truth table of input/output signals of the selector 403 in the match search (search mode=00). Note that the GMASK and KEY signals are input in pairs, and the GMASK signal serves as a mask function for each bit of the KEY signal. That is, if the GMASK signal has a value "1", K signals as input signals of the 4-bit magnitude comparator_1 401 always have a value "1" regardless of the value of a corresponding KEY signal. CA signals also have a value "1", and corresponding bits are "Don't Care". The determination result is output as an Hm signal. The Hm signal indicates that data matches search conditions (discriminants) when it has a value "1", and it indicates that data does not match the search conditions when it has a value "0". In this specification, matching with search conditions may be expressed as being hit or a hit.

FIG. 16 shows a truth table of the input/output signals of the selector 403 in the mismatch search (search mode=01). The roles of the 4-bit magnitude comparator_1 401 and 4-bit magnitude comparator_2 402, and the operation of the GMASK signal in the mismatch search are the same as in the match search (search mode=00) except for points to be described next.

An AF signal is a carry signal output from the least significant comparator core portion in a connected region, and has a value "1" while the signal matches search conditions after the least significant bit. That is, if an AFIm signal of the selector 403 has a value "1", and an EQ1 signal has a value "0" (because of the mismatch search), which indicates that the carry signal of the 4-bit magnitude comparator_1 401 matches the search conditions, or the CONTA or GMASK signal as a mask signal has a value "1", an AFOm signal has a value "1". Note that if a LINK[m] signal has a value "1", the AFOm signal unconditionally has the value 1 as an initial value since it is on the border of a connected region. The AFI0 signal has a value "1", as described above.

If the connected region as a whole is masked by the mask signal, the carry signal AF is necessary for determining that the data matches the search conditions. For example, since if all the GMASK signals have a value "1" in a connected region, the EQ1 signal as a carry signal output of the 4-bit magnitude comparator_1 401 of the most significant comparator core portion has a value "1", it is determined that the data does not match the search conditions in the mismatch search. The carry signal AF plays a role of preventing this error decision.

In the range search (search mode=10) and the out-of-range search (search mode=11), the CONTB signal has a lower limit of a region. The selector 403 outputs a value "0" to the DC signal, and stops the functions of the CONTB and GMASK signals which serve as mask signals for each bit in the match search (search mode=00) or the like. That is, the MODE signal input to the comparator 202 in a search determines whether the CONTB signal held in the external memory (memory unit) serves as "Don't Care" information or search data. In the range search and the out-of-range search, the CONTB signal serves as search data according to the MODE signal. In the range search (search mode=10) and the out-of-range search (search mode=11), the 4-bit magnitude comparator_1 401 compares the upper limit of the range and a search key K[0:3], and the 4-bit magnitude comparator_2 402 compares the lower limit of the range and the search key K[0:3]. Carry signals including LG1, EQ1, SM1, LG2, EQ2, and SM2 signals as comparison results are input to the selector 403.

FIG. 17 shows a truth table of the input/output signals of the selector 403 in the range search (search mode=10). FIG. 18 shows a truth table of the input/output signals of the selector 403 in the out-of-range search (search mode=11).

As shown in the truth tables, in the range search (search mode=10) and the out-of-range search (search mode=11), the Hm signal as a determination result is output when the LINK signal input to a comparator core portion has a value "1", that is, when the comparator core portion is on the border of a connected region. As described above, the comparator core portions are selectively connected in accordance with the LINK signal. The value of the LINK signal is designation data for designating comparator core portions to be connected, and is set for each search.

Furthermore, if the LINK signal input to a comparator core portion has a value "1" and the GMASK signal has a value 0xF, the selector 403 outputs a value "1" to the Hm signal regardless of the search key K[0:3], and indicates that the data matches the search conditions. That is, each connected region (connected comparator core portions) can be masked, and "Don't Care" bits can be set.

As described above, in this embodiment, the CONTA, CONTB, and MODE signals represent discriminants, and the control unit 106 reads out the signals from the memory 201 to set in the comparator core portions. The selector 403 selectively connects comparator core portions. The control unit 106 reads out the LINK signal from the memory 201 and sets it in the selector 403. The selector 403 connects the comparator core portions in accordance with the LINK signal. In performing a search, the LINK signal designates comparator core portions used in the search, and the comparator core portions connected according to the LINK signal determine whether search data match the discriminants designated by the CONTA, CONTB, and MODE signals.

The memory 201 can store a plurality of discriminants, that is, search conditions. FIG. 6 shows the search conditions in this embodiment. The search conditions stored in the memory 201 include LINK data as designation data designating comparator core portions to be connected. That is, the search conditions include discriminants and LINK data as designation data designating comparator core portions which are connected to determine whether search data match the discriminants. The memory 201 can store a plurality of sets of search conditions.

In determination processing of searching for discriminants which search data match by using a plurality of comparator core portions, the control unit 106 reads out each set of search conditions and LINK data stored in the memory 201. The control unit 106 sequentially sets the discriminants in the comparator core portions. At the same time, the control unit 106 sets LINK data corresponding to the set discriminant in the selector 403, and connects comparator core portions which determine whether search data match the discriminants. The control unit 106 sequentially performs this setting on each set of search conditions and LINK data stored in the memory. With this processing, the comparator 202 sequentially determines whether search data match discriminants different for each search, and finds discriminants which the search data match.

In this embodiment, a search is completed in 32 clocks since the search is started by the START signal. Search results H0 to H95 output from the comparator core portions 301 to 304 during the search are masked by corresponding LINK and DISABLE signals, and are combined into a HIT[i] signal. Then, the combined signal is input to the control unit 106. That is, the values of HIT[0:31] signals which have been output from search block_1 to search block_32 denoted by reference numerals 103 to 105 for each of 32 clocks are given as a 1024-bit (HIT[0:32]×32) search result corresponding to each of the entry addresses 1102. This search result will be referred to as a search result address bitmap hereinafter.

The control unit 106 counts, from the search result address bitmap, the number of values "1" indicating that data matches search conditions, and transmits, to the interface unit 102 using a HIT_COUNT[0:9] signal, the total number of values together with a DONE signal indicating the end of the search. The control unit 106 transmits the search result address bitmap to the interface unit 102 by an R_BTM[0:31] signal as the search result address bitmap is output. The search result address bitmap is temporarily held in the buffer of the interface unit 102 to undergo a sorting process in an entry address order.

The interface unit 102 uses the DMAC 109 to transfer the search result address bitmap to a storage buffer having an address written in the bitmap address field 605 of the descriptor 601. This search result address bitmap has undergone the sorting process in the entry address order. The storage buffer for the search result address bitmap is prepared in the external memory 107.

After transferring the search result address bitmap, the interface unit 102 writes a value in the end status field 606 of the descriptor 601. In this write processing, a value "1" (indicating normal end) is set in an end status[16:31] and a count value (so-called multi-hit count) obtained from the HIT_COUNT[0:9] signal is set in an end status[0:9]. Subsequently, an INT signal serving as an interrupt signal for end notification is asserted. The interface unit 102 then starts operation of reading out a next address from FIFO 110.

In this embodiment, an address translator 111 is provided for the interface unit 102 to recognize, when the above count value is one or larger, an entry address at which there are search conditions that the data match. The address translator 111 translates the search result address bitmap into an entry address value corresponding to a hit location. Upon writing, in the bitmap address register 502, the start address of the search result address bitmap written in the external memory 107, the address translator 111 reads out the search result address bitmap based on the start address. The address translator 111 also checks the hit location to translate the search result address bitmap into a corresponding entry address value, and stores/displays it in/on the search result address register 503. Meanwhile, the address translator 111 has already started a search for a next candidate hit location in the background. When an address value is read out from the search result address register 503, the address translator 111 stores/displays a next candidate address in/on the search result address register 503. If there is no next candidate, the address translator 111 displays a value "0xFFFF_FFFFF" on the search result address register 503 to represent that there is no hit location.

Note that the address translator 111 retrieves data from the search result address bitmap by 32 bits. The address translator 111 searches from a lower bit address. If the address translator 111 finds a location which has a value "1", it performs translation expressed by equation (1). Assume that the number of retrievals of data by 32 bits from the search result address bitmap is "r", and a bit address at which a value "1" is found, among 32 bits, is "A". In this case, an entry address EA to be obtained is calculated by:

$$EA = A + 32(r-1) \qquad (1)$$

In the above embodiment, 4-bit magnitude comparators are used in the comparator core portions 301 to 304. However, depending on the use of the SE 101, magnitude comparators other than a 4-bit magnitude comparator may be used. Furthermore, the address size of the memory 201 is 32 bits in the above embodiment. It is, however, possible to adopt a size larger than 32 bits although the search time becomes long if the implementation scale is reduced, or it is possible to adopt a size smaller than 32 bits to shorten the search time.

As described above, it is possible to implement a programmable SE in which there can be a plurality of search elements, and the size of each search element and search conditions (or a search mode) can be variously set. It is possible to implement a search engine using standard logic gates.

In this embodiment, the control unit 106 outputs search address S_ADDR[0:31] signals to search block_1 to search block_32 denoted by reference numerals 103 to 105. At this time, the addresses input to search block_1 to search block_32 denoted by reference numerals 103 to 105 are identical. In another embodiment, however, the order of addresses to be output to the S_ADDR[0:31] signals is rearranged for each search block so as to preferentially search an entry address which was a hit the last time around in the second search and subsequent searches for which a search log is available. That is, an LRU (Least Recently Used) table is created for issued entry addresses, and priorities within the LRU table are changed as a search hits an entry address. In this manner, a search order given to the comparator 202 is rearranged for each search. The search order is determined with reference to the search log. In, for example, network processing which often sequentially transmits/receives packets between the same terminals, rearranging the entry addresses using the LRU table shortens the search time, thereby improving performance.

As described above, it is possible to simultaneously search a plurality of combinations of elements in a search, and programmably rearrange the search elements and the search conditions (match, mismatch, range, and out-of-range). This allows to execute various search processes in the same search engine, and therefore improvement of the performance and functionality of the system is expected.

In developing an LSI integrating a search engine which can be formed by standard logic cells, it is possible to have a certain degree of freedom in selection of a semiconductor development vendor. Furthermore, the development period for design and verification becomes short and the semiconductor process is simplified, thereby giving a cost advantage.

Although the specific embodiment of the present invention has been illustrated and described above, other modifications and improvements are possible. It should be understood that the present invention is not limited to the specific modes shown in the above-described embodiment, and is to cover all modifications without departing from the spirit and scope of the present invention as defined by the appended claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-055211, filed Mar. 9, 2009, which is hereby incorporated by reference herein in its entirety.

What is claimed is:

1. An information processing apparatus including a plurality of magnitude comparators, the information processing apparatus comprising:
a processor coupled to a memory, cooperating to function as:
a receiving unit configured to receive a packet from another apparatus;
an acquisition unit configured to acquire a bit string obtained by concatenating an IP address and a port number contained in the packet, delimiter information to divide the plurality of magnitude comparators into a first group and a second group, first decision information indicating a first decision criteria for the magnitude comparators in the first group, and second decision information indicating a second decision criteria for the magnitude comparators in the second group, wherein the first decision criteria and the second decision criteria are different from each other,
a decision unit configured to decide whether the acquired bit string fulfills the first decision criteria and the second decision criteria, wherein the magnitude comparators in the first group decide whether a bit string corresponding to the IP address within the bit string acquired by the acquisition unit fulfills the first decision criteria, and the magnitude comparators in the second group decide whether a bit string corresponding to the port number within the bit string acquired by the acquisition unit fulfills the second decision criteria in parallel, and
an output unit configured to output, based on a first decision result with respect to the first decision criteria and a second decision result with respect to the second decision criteria, information indicating whether the acquired bit string fulfills a predetermined criteria.

2. The information processing apparatus according to claim 1, wherein the magnitude comparators in the first group inform the magnitude comparators in the second group of predetermined values independent of whether the first decision criteria is fulfilled or not.

3. The information processing apparatus according to claim 1, wherein the processor is programmed to function as:
a setting unit configured to set a "Don't Care" bit,
wherein the "Don't Care" bit masks a portion of a decision result by the magnitude comparators in the first group.

4. The information processing apparatus according to claim 1, wherein the acquired bit string includes address information or port number information that is used in communicating with another apparatus.

5. The information processing apparatus according to claim 4, wherein the processor is programmed to function as:
a receiver configured to receive a packet from the other apparatus; and
a discarding unit configured to discard the packet received by the receiver based on the information indicating whether the acquired bit string fulfills the predetermined criteria.

6. The information processing apparatus according to claim 1, wherein each of the first decision criteria and the second decision criteria is one of a match, a mismatch, a range and an out-of-range criteria.

7. An information processing method comprising steps of:
receiving a packet from another apparatus;
acquiring a bit string obtained by concatenating an IP address and a port number contained in the packet, delimiter information to divide a plurality of magnitude comparators into a first group and a second group, first decision information indicating a first decision criteria for the magnitude comparators in the first group, and second decision information indicating a second decision criteria for the magnitude comparators in the second group, wherein the first decision criteria and the second decision criteria are different from each other,
deciding whether the acquired bit string fulfills the first decision criteria and the second decision criteria, wherein the magnitude comparators in the first group decide whether a bit string corresponding to the IP address within the bit string acquired by the acquisition unit fulfills the first decision criteria, and the magnitude comparators in the second group decide whether a bit string corresponding to the port number within the bit string acquired by the acquisition unit fulfills the second decision criteria in parallel, and
outputting, based on a first decision result with respect to the first decision criteria and a second decision result with respect to the second decision criteria, information indicating whether the acquired bit string fulfills a predetermined criteria.

8. The information processing method according to claim 7, wherein each of the first decision criteria and the second decision criteria is one of a match, a mismatch, a range and an out-of-range criteria.

9. A non-transitory computer-readable storage medium storing a computer program that when executed causes a computer to perform an information processing method of an information processing apparatus, the information processing method comprising steps of:
receiving a packet from another apparatus;
acquiring a bit string obtained by concatenating an IP address and a port number contained in the packet, delimiter information to divide a plurality of magnitude comparators into a first group and a second group, first decision information indicating a first decision criteria for the magnitude comparators in the first group, and second decision information indicating a second decision criteria for the magnitude comparators in the second group, wherein the first decision criteria and the second decision criteria are different from each other,
deciding whether the acquired bit string fulfills the first decision criteria and the second decision criteria, wherein the magnitude comparators in the first group decide whether a bit string corresponding to the IP address within the bit string acquired by the acquisition unit fulfills the first decision criteria, and the magnitude comparators in the second group decide whether a bit string corresponding to the port number within the bit string acquired by the acquisition unit fulfills the second decision criteria in parallel, and
outputting, based on a first decision result with respect to the first decision criteria and a second decision result with respect to the second decision criteria, information indicating whether the acquired bit string fulfills a predetermined criteria.

10. The storage medium according to claim 9, wherein each of the first decision criteria and the second decision criteria is one of a match, a mismatch, a range and an out-of-range criteria.

* * * * *